United States Patent
Natsui et al.

[11] Patent Number: 5,943,195
[45] Date of Patent: Aug. 24, 1999

[54] MAGNETIC HEAD APPARATUS AND MAGNETIC RECORDING APPARATUS USING THEREOF

[75] Inventors: Akinaga Natsui; Norimoto Nouchi, both of Osaka, Japan

[73] Assignee: Matsushita Electric Industrial Co., Ltd., Osaka, Japan

[21] Appl. No.: 08/826,238

[22] Filed: Mar. 27, 1997

[30] Foreign Application Priority Data

Apr. 23, 1996 [JP] Japan ................................. 8-100939

[51] Int. Cl.⁶ ........................................................ G11B 5/235
[52] U.S. Cl. ........................................................ 360/120
[58] Field of Search .................................. 360/113, 120, 360/126, 125, 119, 104

[56] References Cited

U.S. PATENT DOCUMENTS

| | | | |
|---|---|---|---|
| 4,683,509 | 7/1987 | Steele | 360/119 |
| 5,471,355 | 11/1995 | Ogata et al. | |
| 5,543,990 | 8/1996 | Mizoh et al. | 360/122 |
| 5,715,122 | 2/1998 | Ohmori et al. | 360/123 |

FOREIGN PATENT DOCUMENTS

| | | |
|---|---|---|
| 43 24 667 | 2/1994 | Germany. |
| 7-282410 | 10/1995 | Japan. |

*Primary Examiner*—Allen T. Cao
*Attorney, Agent, or Firm*—Merchant, Gould, Smith, Edell, Welter & Schmidt P.A.

[57] ABSTRACT

A metal-in-gap type magnetic head apparatus in which a pair of magnetic core half bodies, comprising a metallic magnetic film containing Fe as a main component on at least one magnetic core half body, are joined. In the above mentioned structure, at least a part of the surface of a supporting base of the magnetic head comprises a material having a lower standard electrode potential than the metallic magnetic film and thereby the metallic magnetic film has a high saturation flux density. Moreover, a magnetic head apparatus and magnetic recording apparatus of the present invention can have a high reliability even in the strong corrosive environment.

14 Claims, 1 Drawing Sheet

MAGNETIC HEAD APPARATUS AND MAGNETIC RECORDING APPARATUS USING THEREOF

FIELD OF THE INVENTION

The present invention relates to a magnetic head apparatus and to a magnetic recording apparatus using the magnetic head, which is suitable for systems effectively recording and reproducing a large amount of signals, in particular, a high quality VTR and a digital VTR or the like.

BACKGROUND OF THE INVENTION

Recently, systems recording and reproducing a large amount of signals, such as a high quality VTR, a digital VTR or the like have been developed. Consequently, in the field of a magnetic head, the development of a magnetic head having a high saturation magnetic flux density has been demanded. FIG. 1 shows a metal-in-gap type magnetic head. As shown in FIG. 1, a pair of core half bodies 1 made of ferrite comprise a metal magnetic film 2 on the facing sides of the half bodies. The pair of core half bodies 1 are joined by a joint glass 3, thus forming a magnetic gap 4 in the jointed part of the pair of core half bodies. As explained above, in this metal-in-gap type magnetic head, a metallic magnetic film 2 is formed in the vicinity of a magnetic gap 4, and consequently the excellent electro-magnetic conversion property is performed. FIG. 2 shows a magnetic head apparatus with which the above mentioned magnetic head is provided. As shown in FIG. 2, a magnetic head is fixed to the tip of a supporting base 5 by means of adhesive or the like, thus forming the magnetic head apparatus.

For the supporting base of the magnetic head of the prior art, brass (standard electrode potential is approximately −0.2 V) was used.

In a system recording and reproducing a large amount of great deal of signals, such as a high quality VTR, a digital VTR or the like, the technology for increasing magnetic flux density is required. In particular, the technology for a short wave recording by a narrow gap magnetic head into the magnetic recording medium having high resistance against the magnetic force is important. In this case, it is required that a magnetic film for a magnetic head have a high saturation magnetic flux density so as to prevent the tip of the magnetic head from saturating magnetic flux density. For a material having a high saturation magnetic flux density, a material having Fe as a main component, for example, Fe—C type or Fe—N type or the like can be used. In particular, increasing the ratio of Fe is a proper way to increase the saturation magnetic flux density. However, if the magnetic head apparatus is subjected to a strongly corrosive environment, the more a material contains Fe, the more the magnetic property is deteriorated due to the effect of the atmosphere of the corrosive environment. Consequently, the predetermined electro-magnetic conversion property cannot be maintained. A brass, which was used in the prior art, had a problem in terms of the corrosion resistance.

SUMMARY OF THE INVENTION

The inventor et al. of the present invention have considered the corrosion of the standard electric potential of each component member of the corrosive head apparatus in the metal-in-gap type magnetic head apparatus comprising Fe as a main component and using a metallic magnetic film having a high saturation flux density. As a result, we found that in a case where the standard electrode potential of the metallic magnetic film is lower than the standard electrode potential of brass (approximately −0.2V) of the supporting base, the head apparatus occasionally corrodes, and that a brass which has been used in the prior art has a problem in terms of the corrosion resistance.

The object of the present invention is to provide a magnetic head apparatus which comprises a metallic magnetic film containing Fe as a main component and having a high saturation flux density in a part of the magnetic core, and which has high reliability even in a strongly corrosive environment.

In order to achieve the above mentioned object, the present invention provides the magnetic head apparatus which is a metal-in-gap type magnetic head in which a pair of magnetic core half bodies comprising a metallic magnetic film containing Fe as a main component on at least one magnetic core half body are jointed, and at least a part of the surface of a supporting base of the magnetic head comprises a material which has a lower standard electrode potential than the metallic magnetic film. It is preferable that the difference of the standard electrode potential between the magnetic head and the supporting base is not less than 0.05V. It is more desired that the difference is not less than 0.1V.

It is preferable in the above mentioned magnetic head apparatus that a magnetic core is electrically connected to the supporting base.

It is further preferable in the above mentioned magnetic head apparatus that the material which has a lower standard electrode potential than a metallic magnetic film is at least one metal selected from the group consisting of Ga, Cr, Zn, Mn, V, Zr, Ti, Al, Hf, Be, Mg, Nb, La and Ta or metallic compound including at least one of the above mentioned metals.

It is also preferable in the above mentioned magnetic head apparatus that the metallic magnetic film containing Fe as a main component is at least one metallic magnetic film selected from the group consisting of FeAlSi film, FeSiGaRu film, FeTaN film, FeTaC film and FeNi film. The standard electrode potential of these metallic magnetic films are in the range of approximately −0.3 to +0.3 V on a scale in which the electrode potential of hydrogen is zero. On the other hand, at least the surface of the supporting base for the above mentioned magnetic head is formed by a metal or a metallic compound having a lower standard electrode potential than the above mentioned metallic magnetic film. For example, Al has a standard electrode potential of approximately −1.7V.

The standard electrode potential of the above mentioned materials used for a metallic magnetic film are shown as follows.

| Materials | Standard Electrode Potential (V) |
| --- | --- |
| Al | −1.7 |
| Ga | −0.5 |
| Cr | −0.7 |
| Zn | −0.8 |
| Mn | −1.2 |
| V | −1.2 |
| Zr | −1.5 |
| Ti | −1.6 |
| Hf | −1.7 |
| Be | −1.8 |
| Mg | −2.4 |

-continued

| Materials | Standard Electrode Potential (V) |
|---|---|
| Nb | −1.1 |
| La | −2.5 |
| Ta | −0.8 |

It is preferable in the above mentioned magnetic head apparatus that a material which has a lower standard electrode potential than a metallic magnetic film is used for a part of said supporting base.

It is further preferable in the above mentioned magnetic head apparatus that a material which has a lower standard electrode potential than a metallic magnetic film is formed on the supporting base by at least one method selected from the group consisting of a press molding method, a cutting molding method, a sputtering method, a vacuum evaporation method, a metal planting method, an ion implanting method and a plasma CVD method.

It is also preferable in the above mentioned magnetic head apparatus that the material which has a lower standard electrode potential than a metallic magnetic film is formed to the thickness in the range of 0.1 $\mu$m to 5 mm on the surface of the supporting base. More preferably, the thickness of the metallic magnetic film is 0.7 $\mu$m–1.2 mm.

According to the above mentioned structure of the present invention, the magnetic recording apparatus is equipped with the magnetic head apparatus which is a metal-in-gap type magnetic head in which a pair of magnetic core half bodies comprising a metallic magnetic film containing Fe as a main component on at least one magnetic core half body, are joined, and at least a part of the surface of a supporting base of the magnetic head comprises a material which has a lower standard electrode potential than the metallic magnetic film.

It is preferable that the above mentioned magnetic recording apparatus is equipped with the magnetic head apparatus in which the magnetic core is electrically connected to the supporting base.

It is also preferable that the above mentioned magnetic recording apparatus is equipped with the magnetic head apparatus in which the material having a lower standard electrode potential than the metallic magnetic film is at least one metal selected from the group consisting of Ga, Cr, Zn, Mn, V, Zr, Ti, Al, Hf, Be, Mg, Nb, La and Ta or metallic compound including at least one of the metals.

It is further preferable that the above mentioned magnetic recording apparatus is equipped with the magnetic head apparatus in which the metallic magnetic film containing Fe as a main component is at least one metallic magnetic film selected from the group consisting of FeAlSi film, FeSi-GaRu film, FeTaN film, FeTaC film and FeNi film.

It is preferable that the above mentioned magnetic recording apparatus is equipped with the magnetic head apparatus in which the material having a lower standard electrode potential than the metallic magnetic film is used for a part of said supporting base.

It is also preferable that the above mentioned magnetic recording apparatus is equipped with the magnetic head apparatus in which the material having a lower standard electrode potential than the metallic magnetic film is formed on the supporting base by at least one method selected from the group consisting of a press molding method, a cutting molding method, a sputtering method, a vacuum evaporation method, a metal plating method, an ion implanting method and a plasma CVD method.

It is preferable that the above mentioned magnetic recording apparatus is equipped with the magnetic head apparatus in which the material having a lower standard electrode potential than the metallic magnetic film is formed in a thickness in the range of 0.1 $\mu$m to 5 mm on the surface of the supporting base.

According to the above mentioned structure of the present invention, the magnetic head apparatus is a metal-in-gap type magnetic head in which a pair of magnetic core half bodies comprising a metallic magnetic film containing Fe as a main component on at least one magnetic core half body, are joined, and at least a part of the surface of a supporting base of the magnetic head comprises a material which has a lower standard electrode potential than the metallic magnetic film. In the case where the magnetic head equipped with the metallic magnetic film containing Fe as a main component is left in the strong corrosive environment, if the surface of the supporting base of the magnetic head is made of materials having a lower standard electrode potential than metallic magnetic film, the surface of the supporting base is oxidized earlier. Consequently, a local cell is formed between the magnetic core half body and supporting base, making the metallic magnetic film a cathode. As a result, the corrosion of the metallic magnetic film is inhibited and can be used stably. Moreover, a high performance magnetic head apparatus comprising magnetic materials containing Fe which has a high saturation flux density as a main component can be made.

According to the above mentioned preferable embodiment in which a magnetic core is electrically connected to the supporting base, the surface of the supporting base is oxidized earlier than a metallic magnetic film in the strong corrosive environment. When the magnetic core has a positive electrical connection to the supporting base, the above mentioned local cell is efficiently formed. As a result, the metallic magnetic film is made to be a cathode with less oxidation than that of the surface of the supporting base. In other words, an oxidation of the metallic magnetic material can be prevented.

Moreover, in the case where the magnetic recording apparatus is made by the use of the above mentioned magnetic head, a magnetic recording apparatus having a high reliability can be provided.

In addition, the method for forming a material which has a lower standard electrode potential than a metallic magnetic film on at least a part of the surface of the supporting base is not limited to the method of the press molding method and the cutting molding method. The same effect could be obtained in the case of forming films by a sputtering method or a vacuum evaporation method. Furthermore, a metal plating method, an ion implanting method and a plasma CVD method may be employed. As a material which has lower standard electrode potential than a metallic magnetic film, Al is preferably used. However, it is not limited to Al. The same effect could be provided in a case where materials other than Al which have the lower standard electrode potential than a metallic magnetic film were employed. Furthermore, the corrosion resistance was observed by forming a material having the lower standard electrode potential than a metallic magnetic film on at least one part of the surface or the entire surface of the supporting base.

DETAILED DESCRIPTION OF THE INVENTION

Referring now to specific embodiments, the present invention will be explained as follows. However, the present invention is not limited to these embodiments.

EXAMPLE 1

Figure 1:
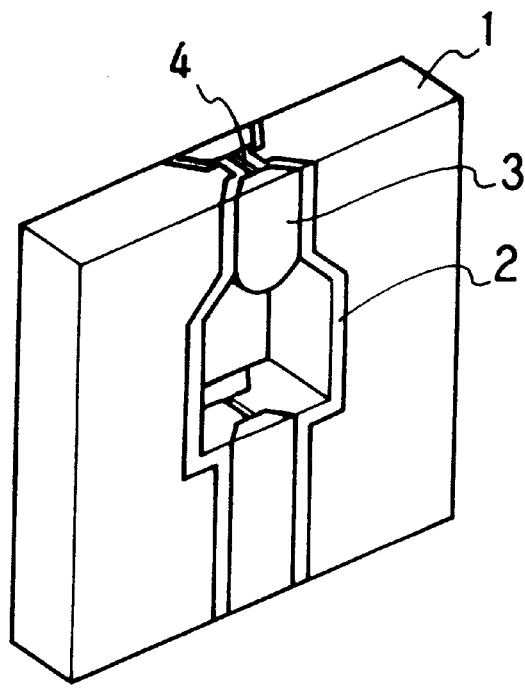
FIG. 1 is a perspective view showing the metal-in-gap head of one embodiment of the present invention.
Figure 2:
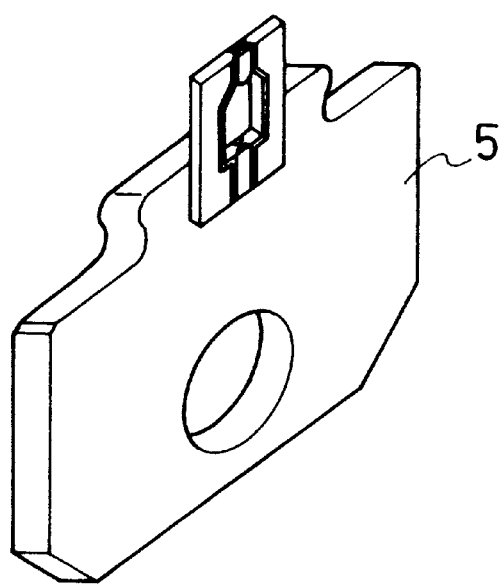
FIG. 2 is a perspective view showing the magnetic head apparatus of one embodiment of the present invention.

In the magnetic head apparatus of one embodiment of the present invention, for a metallic magnetic film 2 of FIG. 1 and FIG. 2, which contains Fe as a main component, an FeAlSi film (standard electrode potential is approximately −0.3V on a scale in which the electrode potential of hydrogen is zero) was used. The metallic magnetic film 2 was formed to the thickness of approximately 5 μm by the sputtering method. Then, for a supporting base 5, Al (standard electrode potential is approximately −1.7V) was used. The supporting base 5 was formed to the thickness of approximately 0.75 mm by the press molding method. Moreover, the magnetic head is fixed to the supporting base by the use of a UV-ray setting adhesive.

The accelerated corrosion test was conducted for the magnetic head apparatus obtained through the above mentioned procedures. The test was conducted in a way in which a magnetic head apparatus was left in an atmosphere of corrosion and under the strong corrosive environment such as a high temperature and high humidity. In this case, a magnetic head apparatus was allowed to stand to one cycle of a salt spray test as described in JIS C 0024 (a magnetic head apparatus was kept under a temperature of 35° C. and a humidity of 95% and under a spray of 5% solution of salt for 8 hours, and then kept under a temperature of 35° C. and humidity of 95% for 16 hours). As a result of the above mentioned test, oxidation was not observed in the metallic magnetic film 2 of the magnetic head apparatus. Of course, the quality of the metallic magnetic film 2 was not deteriorated.

EXAMPLE 2

In the magnetic head apparatus of one embodiment of the present invention, an FeAlSi film was used for a metallic magnetic film 2 of FIG. 1 and FIG. 2, which contains Fe as a main component. The metallic magnetic film 2 was formed to the thickness of approximately 5 μm by the sputtering method. Then, for a supporting base 5, Al film was formed on the surface of a base made of brass by the sputtering method. The thickness thereof was approximately 2 μm.

The accelerated corrosion test was conducted for the magnetic head apparatus obtained through the above mentioned procedure. The test was conducted in a way in which a magnetic head apparatus was left in an atmosphere of corrosion and under the strong corrosion environment such as a high temperature and high humidity. In this case, a magnetic head apparatus was allowed to stand to one cycle of the salt spray test as described in JIS C 0024. As a result of the above mentioned test, oxidation was not observed in the metallic magnetic film 2 of the magnetic head apparatus. Of course, the quality of the metallic magnetic film 2 was not deteriorated.

EXAMPLE 3

In the magnetic head apparatus of one embodiment of the present invention, an FeAlSi film was used for a metallic magnetic film 2 of FIG. 1 and FIG. 2, which contains Fe as a main component. The metallic magnetic film 2 was formed to the thickness of approximately 5 μm by the sputtering method. Then, for a supporting base 5, Zn film (standard electrode potential is approximately −0.8V) was formed on the surface of a base made of brass by the electric metal plating method. The thickness thereof was approximately 15 μm.

The accelerated corrosion test was conducted for a magnetic head apparatus obtained through the above mentioned procedure. The test was conducted in a way in which a magnetic head apparatus was left in an atmosphere of corrosion and under the strong corrosion environment such as a high temperature and high humidity. In this case, a magnetic head apparatus was allowed to stand to one cycle of the salt spray test which is described in JIS C 0024. As a result of the above mentioned test, oxidation was not observed in the metallic magnetic film 2 of the magnetic head apparatus. Of course, the quality of the metallic magnetic film 2 was not also deteriorated.

COMPARATIVE EXAMPLE 1

The same experiment as in Example 1 was conducted except that brass (standard electrode potential is approximately −0.2V) was used for the supporting base 5 in the conventional magnetic head apparatus.

As a result of one cycle of experiment, oxidation was observed for a metallic magnetic film 2 in all cases.

As explained above, the present invention can provide a magnetic head apparatus which is a metal-in-gap type magnetic head in which a pair of magnetic core half bodies, comprising a metallic magnetic film containing Fe as a main component on at least one magnetic core half body, are joined. In the above mentioned structure, at least a part of the surface of a supporting base of the magnetic head comprises a material having a lower standard electrode potential than the metallic magnetic film, thus making a metallic magnetic film that has high saturation flux density. Moreover, the present invention can provide a magnetic head and magnetic recording apparatus which has high reliability even in the strong corrosive environment.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A magnetic head apparatus comprising a magnetic head which is a metal-in-gap type magnetic head in which a pair of magnetic core half bodies, comprising a metallic magnetic film containing Fe as a main component on at least one magnetic core half body, are joined, and a supporting base carrying the magnetic head, wherein at least a part of the surface of the supporting base for the magnetic head comprises a material having a lower standard electrode potential than that of said metallic magnetic film.

2. The magnetic head apparatus according to claim 1, wherein the magnetic core is electrically connected to the supporting base.

3. The magnetic head apparatus according to claim 1, wherein the material having a lower standard electrode potential than the metallic magnetic film is at least one metal selected from the group consisting of Ga, Cr, Zn, Mn, V, Zr, Ti, Al, Hf, Be, Mg, Nb, La and Ta or metallic compound including at least one of said metals.

4. The magnetic head apparatus according to claim 1, wherein the metallic magnetic film containing Fe as a main component is at least one metallic magnetic film selected from the group consisting of FeAlSi film, FeSiGaRu film, FeTaN film, FeTaC film and FeNi film.

5. The magnetic head apparatus according to claim 1, wherein the material having a lower standard electrode potential than the metallic magnetic film is used for a part of the supporting base.

6. The magnetic head apparatus according to claim 1, wherein the material having a lower standard electrode potential than the metallic magnetic film is formed on the supporting base by at least one method selected from the group consisting of a press molding method, a cutting molding method, a sputtering method, a vacuum evaporation method, a metal plating method, an ion implanting method and a plasma CVD method.

7. The magnetic head apparatus according to claim 1, wherein the material having a lower standard electrode potential than the metallic magnetic film is formed in a thickness in the range of 0.1 $\mu$m to 5 mm on the surface of the supporting base.

8. A magnetic recording apparatus, comprising a magnetic head apparatus which is a metal-in-gap type magnetic head in which a pair of magnetic core half bodies, comprising a metallic magnetic film containing Fe as a main component on at least one magnetic core half body, are joined, and a supporting base carrying said magnetic head, wherein at least a part of the surface of the supporting base comprises a material having a lower standard electrode potential than said metallic magnetic film.

9. The magnetic recording apparatus according to claim 8, wherein the magnetic core is electrically connected to the supporting base.

10. The magnetic recording apparatus according to claim 8, wherein said material having a lower standard electrode potential than the metallic magnetic film is at least one metal selected from the group consisting of Ga, Cr, Zn, Mn, V, Zr, Ti, Al, Hf, Be, Mg, Nb, La and Ta or metallic compound including at least one of said metals.

11. The magnetic recording apparatus according to claim 8, wherein said metallic magnetic film containing Fe as a main component is at least one metallic magnetic film selected from the group consisting of FeAlSi film, FeSiGaRu film, FeTaN film, FeTaC film and FeNi film.

12. The magnetic recording apparatus according to claim 8, wherein the material having a lower standard electrode potential than the metallic magnetic film is used for a part of said supporting base.

13. The magnetic recording apparatus according to claim 8, wherein the material having a lower standard electrode potential than the metallic magnetic film is formed on the supporting base by at least one method selected from the group consisting of a press molding method, a cutting molding method, a sputtering method, a vacuum evaporation method, a metal plating method, an ion implanting method and a plasma CVD method.

14. The magnetic recording apparatus according to claim 8, wherein the material having a lower standard electrode potential than the metallic magnetic film is formed in a thickness in the range of 0.1 $\mu$m to 5 mm on the surface of the supporting base.

* * * * *